(12) United States Patent
Cate et al.

(10) Patent No.: US 7,185,946 B2
(45) Date of Patent: Mar. 6, 2007

(54) AUTOMOBILE ASSEMBLY

(75) Inventors: Peter J. Cate, Blockley (GB); Pádraig Naughton, Schmitten-Dorfweil (DE); Hein J. Koelman, Eppstein (DE)

(73) Assignee: Dow Global Technologies Inc., Midalnd, MI (US)

( * ) Notice: Subject to any disclaimer, the term of this patent is extended or adjusted under 35 U.S.C. 154(b) by 23 days.

(21) Appl. No.: 10/171,936

(22) Filed: Jun. 14, 2002

(65) Prior Publication Data

US 2003/0001410 A1 Jan. 2, 2003

(51) Int. Cl.
B60R 27/00 (2006.01)

(52) U.S. Cl. .................................. 296/193.09

(58) Field of Classification Search ................ 296/187, 296/194, 203.01, 203.02, 187.01, 187.03, 296/187.09, 193.01, 193.09, 193.1; 243/102, 243/103, 112, 120, 121, 132; 293/102, 120, 293/132

See application file for complete search history.

(56) References Cited

U.S. PATENT DOCUMENTS

| | | | |
|---|---|---|---|
| 3,779,592 A * | 12/1973 | Golze et al. | |
| 3,827,740 A * | 8/1974 | Golze et al. | |
| 3,857,813 A * | 12/1974 | Stain et al. | 523/220 |
| 4,460,205 A * | 7/1984 | Glance | 293/120 |
| 4,622,192 A * | 11/1986 | Ma | 264/136 |
| 4,880,704 A * | 11/1989 | Cordova et al. | 428/393 |
| 5,106,928 A | 4/1992 | Skoultchi et al. | 526/196 |
| 5,132,172 A | 7/1992 | Simpson et al. | |
| 5,154,462 A * | 10/1992 | Carpenter | 293/120 |
| 5,269,574 A * | 12/1993 | Bhutani et al. | 293/102 |
| 5,307,428 A | 4/1994 | Blow et al. | |
| 5,387,449 A | 2/1995 | Kunz et al. | |
| 5,428,098 A * | 6/1995 | Brekner et al. | 524/494 |
| 5,456,957 A * | 10/1995 | Jackson et al. | 428/31 |
| 5,539,070 A | 7/1996 | Zharov et al. | 526/198 |
| 5,576,558 A | 11/1996 | Matsuda et al. | |
| 5,639,546 A | 6/1997 | Bilkadi | |
| 5,686,544 A | 11/1997 | Pocius | 526/196 |
| 5,691,065 A | 11/1997 | Zharov et al. | 428/421 |
| 5,718,977 A | 2/1998 | Pocius | 428/422 |
| 5,795,657 A | 8/1998 | Pocius et al. | 428/516 |
| 5,823,602 A * | 10/1998 | Kelman et al. | 296/194 |
| 5,853,857 A | 12/1998 | Mahmood et al. | 428/178 |
| 5,863,642 A * | 1/1999 | Henderson et al. | 428/218 |
| 5,879,757 A | 3/1999 | Gutowski et al. | |
| 5,883,208 A | 3/1999 | Deviny | 526/198 |
| 5,976,291 A | 11/1999 | Schaetzle | |
| 6,082,792 A * | 7/2000 | Evans et al. | 293/120 |

(Continued)

FOREIGN PATENT DOCUMENTS

WO WO 99/64475 12/1999

(Continued)

OTHER PUBLICATIONS

Derwent 2001-357925, Decker et al; France Patent 2801027-13 "Front face support frame for an automobiles radiator, head lamp and direction signalling equipment, using two crossbars and lateral head lamp supports".

(Continued)

Primary Examiner—H Gutman

(57) ABSTRACT

A method is provided for making an automobile assembly having a molded plastics structural member and a reinforcing member in which a polymerisable adhesive is employed to bond the two members together and an automobile assembly having a bonded structural member and a reinforcing member. The assembly is suitably used as a "front end carrier" or a bumper system in an automobile.

48 Claims, 4 Drawing Sheets

U.S. PATENT DOCUMENTS

| | | | |
|---|---|---|---|
| 6,107,406 A | 8/2000 | Birnbrich et al. | |
| 6,109,586 A * | 8/2000 | Hoek | 248/476 |
| 6,176,965 B1 | 1/2001 | Okui et al. | 156/314 |
| 6,421,979 B1 | 7/2002 | Fischer et al. | 52/745.19 |
| 2002/0058764 A1 | 5/2002 | Sonnenschein et al. | 526/131 |
| 2003/0001410 A1 | 1/2003 | Cate et al. | |
| 2003/0092814 A1* | 5/2003 | Borgner et al. | 524/440 |
| 2004/0091700 A1* | 5/2004 | Shah | 428/336 |
| 2004/0096610 A1 | 5/2004 | Ramanathan et al. | |
| 2004/0260008 A1* | 12/2004 | Bechara et al. | 524/507 |
| 2005/0014906 A1* | 1/2005 | Niino | 525/342 |
| 2005/0035609 A1 | 2/2005 | Cate et al. | |

FOREIGN PATENT DOCUMENTS

WO     WO00/33806     6/2000

OTHER PUBLICATIONS

Derwent 2001-137906, Pleschke et al., WO 200100478—"Front end module for a vehicle, comprises a bumper cross-member and front end support injection molded as a single unit together with metal plates".

Case 60043—U.S. Appl. No. 09/466,321, filed Dec. 17, 1999, Mark F. Sonnenschein et al., "Amine Organoborane Complex Polymerization Initiators and Polymerizable Compositions".

AN-1999-011130—As a Metal Box Profile for Cars and Other Vehicles—Henkel Corporation; Wychech J.S.

* cited by examiner

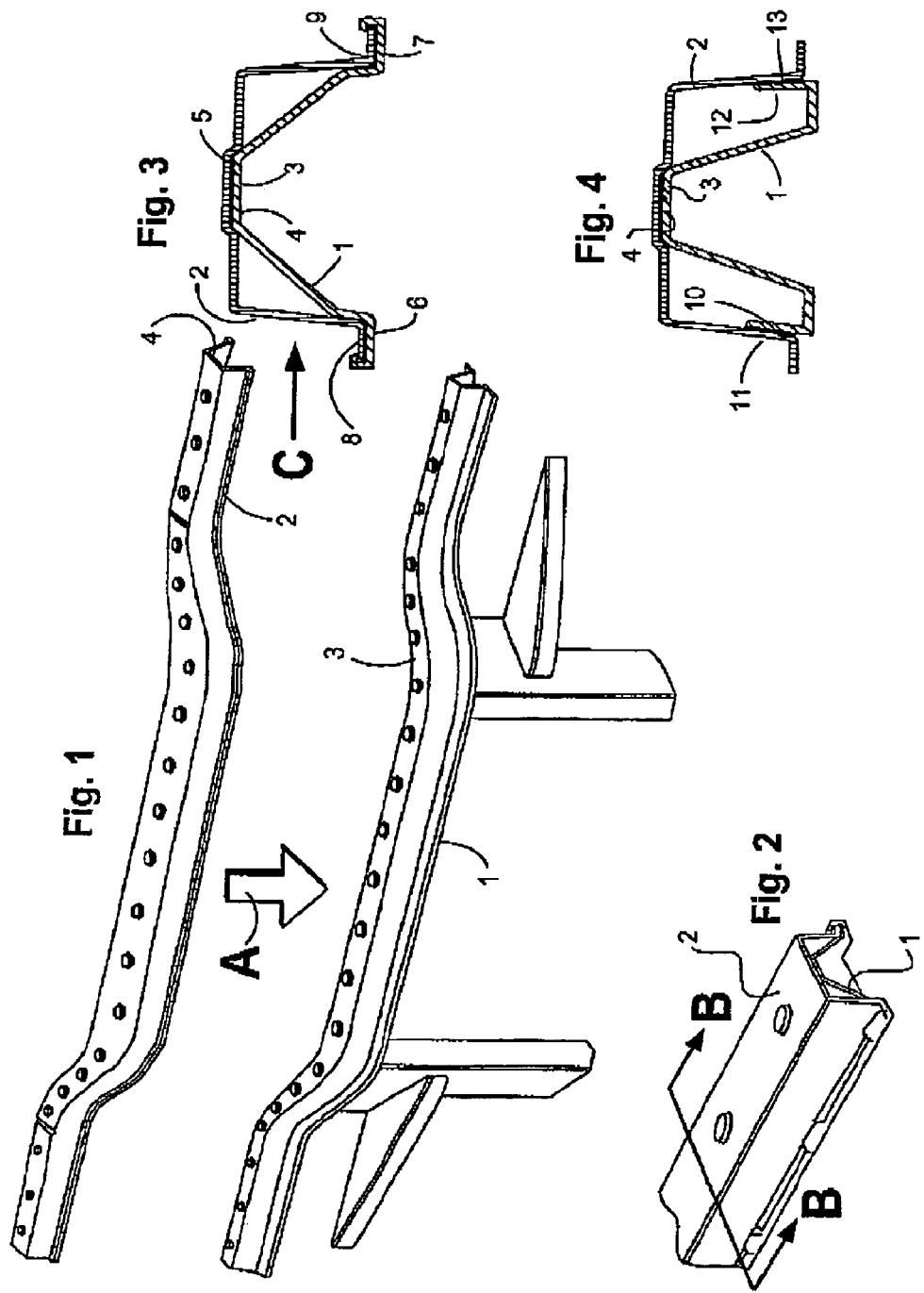

AUTOMOBILE ASSEMBLY

BACKGROUND TO THE INVENTION

This invention relates to an automobile assembly, in particular to structural assemblies employed at the front end known as a "front end carrier" or rear end of an automobile and also to assemblies for use as bumper systems. The invention is especially concerned with automobile structural assemblies having a reinforcing member and a structural member which are connected together by means of an adhesive.

An automobile bumper system typically comprises a "bumper beam" and a "bumper fascia". Typically the bumper beam is bolted to the chassis of the automobile and the fascia is connected to the body panels. An energy absorption unit is typically disposed between the fascia and beam. A bumper beam is typically made of a rigid material, for example steel and aluminium, to provide structural integrity and an impact reaction surface and may act as a reinforcing member in the bumper system. The "bumper fascia" is shaped so as to abut or to be connectable to the energy absorption unit and also to have aesthetic appeal, it being part of the external part of the bumper system. A "bumper fascia" may typically be made of or comprise a molded plastics material.

Energy absorption units (EAU) may be made of metal, for example steel and aluminium, or may be made of plastics material. The EAU compresses or distorts on impact so absorbing the energy of the impact. Conventional plastic bumper EAUs may be assembled for example by heating staking points so as to weld the plastics material of the EAU and the fascia together. This process may however leave undesirable visible marks on the fascia.

The fascia may also be attached to the EAU using mechanical fixing means.

The EAU may be connected to the bumper beam or may be located close to but spaced from the beam. Typically, the EAU may be connected to the beam using mechanical fixing means.

Referring to FIG. 12, a "front end carrier" (21) (hereafter FEC) for an automobile (22) is that part of the body of the automobile which joins the two sides (23 and 24) of the front of the automobile (22) together and is aligned transversely so as to enclose a front, typically engine, compartment (25). The FEC is shaped for aesthetic and functional purposes, and typically houses or is otherwise used to carry one or more of the lighting assemblies, the cooling system and the latch by which the bonnet is secured when closed.

Traditional adhesives do not bond effectively to plastics materials of the type used in FECs and which may be used in bumper systems due to the low surface energy of the plastic materials. As such it is believed adhesives have not hitherto been employed for fabricating FECs, bumper systems and the like.

Adhesives for use in bonding to low surface energy materials are however known. For example U.S. Pat. No. 5,795,657 discloses adhesive compositions which are said to have excellent adhesion to a variety of substrates especially low surface energy polymers. The adhesive disclosed in this document relates to organoborane polyamine complexes and especially complexes wherein the polyamine is reaction product of dye primary amine terminated material and material having at least two groups reactive with primary amine with an excess of primary amine groups over groups reactive with primary amine. The complexes may be used in systems that initiate the polymerization of acrylic monomer to yield acrylic adhesive compositions. Such compositions are said to be useful for bonding low surface energy plastic or polymer substrates. U.S. Pat. No. 5,795,657 refers to organoborane amine complexes used in acrylic adhesives and which may be employed in structural and semi-structural applications including glass/metal bonding and bonding other types of materials together. Reference is made to bonding plastic to a range of types of materials of which one is metal.

PRIOR ART

U.S. Pat. No. 5,691,065 relates to organoborane amine complexes and to acrylic adhesives that incorporate initiator systems based on such complexes. The adhesives are especially useful in bonding low surface energy substrates such as polyethylene, polypropylene and polytetrafluoroethylene. In the Examples in this document Examples 14 to 118 provide data concerning adhesion to a polyethylene substrate or a polytetrafluoro-ethylene substrate. Examples 121 to 125 additionally include reference to adhesion of a polypropylene substrate which is bonded to a substrate of the same material.

These prior art documents do not contemplate the use of adhesives to bond reinforcing components to plastic mouldings in automobile applications in which a combination of practical and technical criteria must be met. In particular, there is no indication in these documents that adhesives may be employed in FEC's or bumper systems which, by the nature of their use, are exposed to impact and high stresses and strains.

In view of the widespread consumer use of automobiles, matters of safety, such as improved crash resistance, durability and stiffness of the FEC and robustness, resistance to heat, chemical inertness and recoverability in low speed impacts of bumper systems, together with cost and manufacturing flexibility are critical in the design and manufacture of automobiles.

The known technique of mechanical fixing of the reinforcing member to the plastic structural member has drawbacks as regards structural limitations, and stress concentrations and forming a component, for example an FEC and a bumper system by moulding the plastic in situ, for example through holes in the reinforcement, is costly and inflexible which may limit design options and also increase costs of production. Producing the components for use in FEC's and bumpers by in situ moulding around the reinforcement also requires the moulding tool to have a complementary design to the reinforcing component so any changes in the design of the reinforcing component require modifications to the moulding tool hence introducing further process complication and cost. A need remains therefore to improve the optimum combination of safety, cost and manufacturing flexibility.

SUMMARY OF THE INVENTION

We have now found a method by which the reinforcing member may be attached to the plastic structural member in automobile assemblies such as FECs and bumper systems which ameliorates or removes the drawbacks associated with existing methods of producing them. By employing certain types of adhesive which are capable of bonding to low energy surfaces such as plastics materials used in FECs and bumper systems, the need for attachment through mechanical fixing or in situ formation of a plastic moulding around a reinforcing component may be reduced or avoided.

Accordingly, a first aspect of the invention provides a method for producing an automobile assembly comprising a structural member made of a molded plastics material having a low energy surface and a reinforcing member attached to the structural member, the members having complementary surfaces, which comprises applying an adhesive to the complementary surface of the structural member and/or reinforcing member, bringing the complementary surfaces of the reinforcing member and structural member into contact and allowing the adhesive to set so as to bond the structural member and reinforcing member together wherein the adhesive is capable of bonding to a low energy surface plastic.

By low energy surface plastic is meant materials that have a surface energy of less than 45 mJ/m$^2$, suitably less than 40 mJ/m$^2$ and desirably less than 35 mJ/m$^2$ including, by way of example polypropylene and polyamide. If desired, the surface of the structural member and/or reinforcing member may be treated or primed to improve adhesion prior to application of the adhesive. Suitably the structural member is not subjected to treatment or priming and the adhesive is applied directly to the surface of the structural member.

In a second aspect, the invention provides for the use of an adhesive capable of bonding to a low energy surface substrate in the fabrication of an automobile assembly which comprises a structural member comprising a plastic moulding having a low energy surface and a reinforcing member to bond together the said moulding and reinforcing member.

In a third aspect, the invention provides an automobile assembly comprising a structural member made of a molded plastics material having a low energy surface and a reinforcing member attached to the structural member, the structural member and reinforcing member having complementary surfaces and being attached by means of an adhesive, which is capable of bonding to a low energy surface substrate, on at least part of one or both of the complementary surfaces.

The present invention may be applied to any automobile assemblies in which a material is to be bonded to a low energy surface material for example "front end" systems and "rear end" systems and a bumper system.

Advantageously, the invention permits the structural member and the reinforcing member to be attached after the structural member has been produced so avoiding the drawbacks of the known process in which the structural member is formed in situ. Thus the risk of having to alter the tools for producing the structural member if the reinforcing member design alters is reduced. Further, the design and hence structural effectiveness of the reinforcing member is not compromised by limitations on the geometry, shape or dimensions of the reinforcing member imposed by the tooling apparatus. The invention accordingly provides advantages as regards enhanced process flexibility, design of the assembly and cost. In addition reinforcements of a complex design may be employed to provide a higher level of reinforcement per unit weight of reinforcement. This arrangement may provide additional benefits as regards design flexibility, reduced weight with the advantages that flow from that.

BRIEF DESCRIPTION OF THE DRAWINGS

The invention is described with reference to the accompanying Figures in which:

FIG. 1 shows a perspective view of a structural member and a reinforcing member prior to assembly.

FIG. 2 shows a perspective view of a part of a bonded automobile assembly.

FIG. 3 shows a cross-section of the assembly of FIG. 2 as shown at line B—B of FIG. 2.

FIG. 4 shows a cross-section of an alternative design of assembly to that shown in FIG. 3.

DETAILED DESCRIPTION OF THE INVENTION

Figure 5:
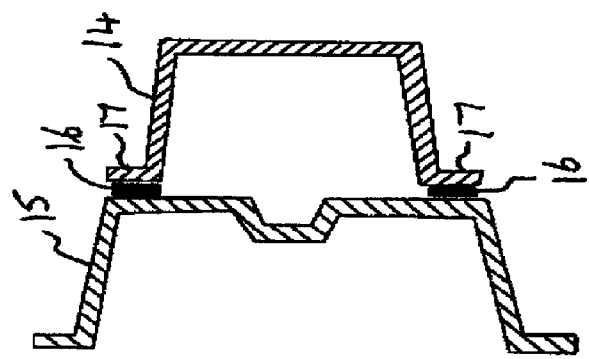
FIGS. 5 to 8 show cross-section views of different examples of bumper systems according to the invention.

In a preferred embodiment, the structural member and reinforcing member have complementary shapes, at least in part and they are bonded together by application of adhesive on either or both of the complementary parts of the members so as to bond the two parts together over an area which is significantly greater than the area associated with joining the parts by mechanical fixing. Advantageously, bonding the structural member and reinforcing member in this manner reduces the concentration of stress at the joints between the two members. Preferably, the structural member and reinforcing member are bonded together by a continuum of adhesive along the complementary surfaces on the two members in order to reduce the concentration of stress at a particular point when load is applied to the assembly.

The automobile assembly, for example a FEC and a bumper system, is suitably manufactured employing known techniques for producing the structural member for example compression or injection moulding.

Suitably the structural member comprises a plastic moulding. The plastics material preferably comprises a homopolymer, for example a polyolefin, a polyamide, a polyphenylene oxide and polystyrene, or a copolymer, for example a polyalkylene terephthalate, having a low surface energy.

Preferred plastics materials include polypropylene, polyamide, polyamide alloys, polyphenylene oxide polymers, polyphenylene oxide alloys, polystyrene polymers, polystyrene alloys, polybutylene terephthalate polymers and polybutylene terephthalate alloys. The plastics material may contain fibre, for example short glass fibre, long glass fibre, short natural fibre or long natural fibre.

Especially preferred plastics materials include short glass fibre filled polypropylene, long glass fibre filled polypropylene, glass filled polyamide and glass filled polyamide alloys.—Plastics materials which are especially preferred for use in bumper systems as the EAU include unfilled polypropylene, talc filled polypropylene, mineral filled polypropylene.]

The reinforcing member is suitably made of a metal, for example steel, zinc and aluminium, but may be made from other materials capable of providing reinforcement. The reinforcing member may be coated with materials typically employed in the manufacture of automobiles, for example anti-corrosion materials and primers for additional coatings such as paint.

In an especially preferred embodiment of the invention in which the assembly is a FEC, the structural member is made from glass filled polypropylene and/or glass filled polyamide and the reinforcing member is made from steel or aluminium. In a further preferred embodiment, the assembly is a bumper system and the structural member is made from polypropylene and the reinforcing member is made from steel, aluminium or polypropylene.

In a bumper system, the EAU is suitably disposed between the bumper fascia and the bumper beam. The EAU preferably has a generally "C" shaped cross-section. The open ends of the "C" shaped EAU may be connected to the beam and the opposite side of the "C" connected to the fascia or vice-versa by means of the adhesive. Where the EAU is connected to the beam by means of the adhesive, the EAU is the structural member and the beam the reinforcing member. Where the EAU is connected to the fascia by means of the adhesive, the fascia and EAU are for present purposes the structural member and reinforcing member.

The reinforcing member and/or structural member may be provided with contours or channels which are complementary with the surface of the other member so as to provide improved contact and alignment between the structural and reinforcing members. Shaping the members suitably provides enhanced resistance to stresses as the adhesion between the members may be supplemented by physical abutment depending on the direction in which the stress is applied.

The adhesive employed in the present invention must be able to bond a low energy surface substrate and also act to bond a second substrate to the low energy surface substrate and, preferably is a polymerizable composition.

In a preferred method the structural member and reinforcing member are bonded together by providing an adhesive comprising a polymerizable composition, contacting together the components of the adhesive under conditions for initiating polymerization of the adhesive, applying the adhesive to the complementary surface of the structural and/or reinforcing member, bringing the complementary surfaces of the reinforcing member and structural member into contact and curing the adhesive so as to bond the said members together. Initiating polymerization of the adhesive may be carried out prior to or after application of the adhesive to one or both members or during application or as a result of application of the adhesive to one or both members.

In a preferred embodiment, the adhesive comprises a polymerizable composition comprising an organoborane/amine complex and one or more of monomers, oligomers or polymers having olefinic unsaturation which is capable of polymerization by free radical polymerization. Optionally, the adhesive may additionally comprise a compound which causes the said complex to disassociate so as to release the borane to initiate polymerization of one or more of monomers, oligomers or polymers having olefinic unsaturation. Where a compound which causes the complex to disassociate is employed, it is kept separate from the complex until initiation of polymerization is desired. The polymerizable composition which contains the disassociating agent may be cured at any desired temperature, such as at, or near, ambient temperature and below ambient temperature.

An especially preferred embodiment of the invention provides an automobile assembly comprising a structural member made of a molded glass filled polypropylene and/or glass filled polyamide having a surface energy of less than 45 mJ/m$^2$, and a reinforcing member made from steel, zinc and/or aluminium attached to the structural member, the structural member and reinforcing member having complementary surfaces and being attached by means of an adhesive which is capable of bonding to a substrate having a surface energy of less than 45 mJ/m$^2$ disposed between at least part of the complementary surfaces so as to bond them together, the adhesive being derived from a polymerizable composition comprising i) an organoborane/amine complex;

ii) one or more of monomers, oligomers or polymers having olefinic unsaturation which is capable of polymerization by free radical polymerization; and, optionally iii) a compound which causes the said complex to disassociate so as to release the borane to initiate polymerization of one or more of monomers, oligomers or polymers having olefinic unsaturation.

Additional especially preferred aspects of the invention are a method of making the automobile assembly referred to in the preceding paragraph and use of an adhesive described in that paragraph in fabricating the assembly described in it.

Adhesives and polymerizable compositions disclosed in International Patent Application No. PCT/US00/33806 are especially preferred for use in the present invention to bond the structural member and reinforcing member together.

The amines used to complex the organoborane compound can be any amines which complex the organoborane and which can be decomplexed when exposed to a decomplexing agent. Preferred amines include the primary or secondary amines or polyamines containing primary or secondary amine groups, or ammonia as disclosed in Zharov U.S. Pat. No. 5,539,070 at column 5 lines 41 to 53, incorporated herein by reference, Skoultchi U.S. Pat. No. 5,106,928 at column 2 line 29 to 58 incorporated herein by reference, and Pocius U.S. Pat. No. 5,686,544 column 7, line 29 to Column 10 line 36 incorporated herein by reference; monthanolamine, secondary dialkyl diamines or polyoxyalkylenepolyamines; and amine terminated reaction products of diamines and compounds having two or more groups reactive with amines as disclosed in Deviny U.S. Pat. No. 5,883,208 at column 7 line 30 to column 8 line 56, incorporated herein by reference. With respect to the reaction products described in Deviny the preferred diprimary amines include alkyl diprimary amines, aryl diprimary amines, alkyaryl diprimary amines and polyoxyalkylene diamines; and compounds reactive with amines include compounds which contain two or more groups of carboxylic acids, carboxylic acid esters, carboxylic acid halides, aldehydes, epoxides, alcohols and acrylate groups. Preferred amines include n-octylamine, 1,6-diaminohexane (1,6-hexane diamine), diethylamine, dibutyl amine, diethylene triamine, dipropylene diamine, 1,3-propylene diamine (1,3-propane diamine), 1,2-propylene diamine, 1,2-ethane diamine, 1,5-pentane diamine, 1,12-dodecanediamine, 2-methyl-1,5-pentane diamine, 3-methyl-1,5-pentane diamine, triethylene tetraamine, diethylene triamine. Preferred polyoxyalkylene polyamines include polyethyleneoxide diamine, polypropyleneoxide diamine, triethylene glycol propylene diamine, polytetramethyleneoxide diamine and polyethyleneoxidecopolypropyleneoxide diamine.

In particular, the amine in the organoborane/amine complex is suitably selected from the group of amines having an amidine structural component; aliphatic heterocycles having at least one nitrogen in the heterocyclic ring wherein the heterocyclic compound may also contain one or more nitrogen atoms, oxygen atoms, sulphur atoms, or double bonds in the heterocycle; primary amines which in addition have one or more hydrogen bond accepting groups wherein there are at least two carbon atoms, preferably at least three carbon atoms, between the primary amine and the hydrogen bond accepting group, such that due to inter- or intramolecular interactions within the complex the strength of the B—N bond is increased; and conjugated imines.

Preferred hydrogen bond accepting groups include the following: primary amines, secondary amines, tertiary amines, ethers, halogens, polyethers or polyamines. Heterocycle as used herein refers to a compound having one or more aliphatic cyclic rings of which one of the rings contains nitrogen. The amidines or conjugated imines may be straight or branched chain or cyclic.

Desirably, the organoborane used in the complex is a trialkyl borane or an alkyl cycloalkyl borane. Preferably this borane corresponds to Formula 1:

$$B—(R^1)_3 \qquad \text{Formula 1}$$

wherein B represents boron; and $R^1$ is separately in each occurrence a $C_{1-10}$ alkyl, $C_{3-10}$ cycloalkyl, or two or more of $R^1$ may combine to form a cycloaliphatic ring.

Preferably $R^1$ is $C_{1-4}$ alkyl, even more preferably $C_{2-4}$ alkyl and most preferably $C_{3-4}$ alkyl. Among preferred organoboranes are tri-ethyl borane, tri-isopropyl borane and tri-n-butylborane.

In a preferred embodiment, the amine part of the complex comprises a compound having a primary amine and one or more hydrogen bond accepting groups, wherein there are at least two carbon atoms, preferably at least about three, between the primary amine and hydrogen bond accepting groups.

Preferably, the amine corresponds to Formula 2:

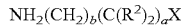

$$NH_2(CH_2)_b(C(R^2)_2)_a X \qquad (2)$$

wherein $R^2$ is separately in each occurrence hydrogen or a $C_{1-10}$ alkyl or $C_{3-10}$ cycloalkyl; X is hydrogen bond accepting moiety; a is an integer of 1 to 10; and b is separately in each occurrence an integer of 0 to 1, and the sum of a and b is from 2 to 10.

Preferably $R^2$ is hydrogen or methyl.

Preferably X is separately in each occurrence a hydrogen accepting moiety and, when the hydrogen accepting moiety is an amine, it is preferably a tertiary or a secondary amine. More preferably X is separately in each occurrence —N($R^8$)$_e$, —OR$^{10}$, or a halogen wherein $R^8$ is separately in each occurrence $C_{1-10}$ alkyl, $C_{3-10}$ cycloalkyl or —(C($R^2$)$_2$)$_d$—W; $R^{10}$ is separately in each occurrence, $C_{1-10}$ alkyl, $C_{3-10}$ cycloalkyl, or —(C($R^2$)$_2$)$_d$—W; and e is 0, 1, or 2. More preferably X is —N($R^8$)$_2$ or —OR$^{10}$.

Preferably, $R^8$ and $R^{10}$ are $C_{1-4}$ alkyl or —(C($R^1$)$_2$)$_d$—W, more preferably $C_{1-4}$ alkyl and most preferably methyl. W is separately in each occurrence hydrogen or $C_{1-10}$ alkyl or X and more preferably hydrogen or $C_{1-4}$ alkyl.

Preferably, a is about 1 or greater and more preferably 2 or greater. Preferably a is about 6 or less, and most preferably about 4 or less. Preferably, b is about 1. Preferably, the sum of a and b is an integer about 2 or greater and most preferably about 3 or greater. Preferably the sum of a and b are about 6 or less and more preferably about 4 or less. Preferably d is separately in each occurrence an integer of 1 to 4, more preferably 2 to 4, and most preferably 2 to 3.

Among preferred amines corresponding to Formula 2 are dimethylaminopropyl amine, methoxypropyl amine, dimethylaminoethylamine, dimethylaminobutylamine, methoxybutyl amine, methoxyethyl amine, ethoxypropylamine, propoxypropylamine, amine terminated polyalkylene ethers (such as trimethylolpropane tris(poly(propyleneglycol), amine terminated)ether), aminopropylmorpholine, isophoronediamine, and aminopropylpropanediamine.

In another embodiment, the amine may be an aliphatic heterocycle having at least one nitrogen in the heterocycle. The heterocyclic compound may also contain one or more of nitrogen, oxygen, sulfur or double bonds. In addition, the heterocycle may comprise multiple rings wherein at least one of the rings has a nitrogen in the ring. Preferred compounds of this type include morpholine, piperidine, pyrolidine, piperazine, 1,3,3 trimethyl 6-azabicyclo[3,2,1]octane, thiazolidine, homopiperazine, aziridine, 1,4-diazabicylo[2.2.2]octane (DABCO), 1-amino-4-methylpiperazine, and 3-pyrroline.

In yet another embodiment, the amine which is suitably complexed with the organoborane is an amidine. Any compound with amidine structure wherein the amidine has sufficient binding energy as described hereinbefore with the organoborane, may be used. Among preferred amidines are 1,8 diazabicyclo[5,4]undec-7-ene; tetrahydropyrimidine; 2-methyl-2-imidazoline; and 1,1,3,3-tetramethylguanidine.

In a further embodiment, the amine which is complexed with the organoborane is suitably a conjugated imine. Any compound with a conjugated imine structure, wherein the imine has sufficient binding energy with the organoborane as described in International Patent Application No. PCT/US00/33806 may be used. The conjugated imine can be a straight or branched chain imine or a cylic imine. Among preferred conjugated imines are 4-dimethylaminopyridine; 2,3-bis(dimethylamino)cyclopropeneimine; 3-(dimethylamine)acroleinimine; 3-(dimethylamino)methacroleinimine.

Preferably the molar ratio of amine compound to organoborane compound is from 1.0:1.0 to 3.0:1.0. Below the ratio of about 1.0:1.0 there may be problems with polymerization, stability of the complex and adhesion. Greater than about a 3.0:1.0 ratio may be used although there may not be additional benefit from using a ratio greater than about 3.0:1.0. If too much amine is present, this may negatively impact the stability of the adhesive or polymer compositions. Preferably the molar ratio of amine compound to organoborane compound is from 2.0:1.0 to 1.0:1.0.

The organoborane amine complex may be readily prepared using known techniques, for example as described or referred to in International Patent Application No. PCT/US00/33806.

Preferably, the polymerizable material comprises acrylate and/or methacrylate based compounds. Especially preferred acrylate and methacrylate compounds include methylmethacrylate, butylmethacrylate, ethylhexylmethacrylate, isobornylmethacrylate, tetrahydrofurfuryl methacrylate, and cyclohexylmethylmethacrylate.

The polymerizable composition may further comprise an effective amount of a compound that is reactive with an amine so as to liberate the organoborane so as to initiate polymerization (a disassociating agent). Desirable amine reactive compounds are those materials that can readily form reaction products with amines at or below and more preferably at room temperature so as to provide a composition that can be generally easily used and cured under ambient conditions. General classes of these compounds include acids, aldehydes, isocyanates, acid chlorides, sulphonyl chlorides, mixtures thereof and the like. Preferred amine reactive compounds are acids, especially Bronsted and Lewis acids and those described in U.S. Pat. No. 5,718,977 and, more desirably acrylic acid and methacrylic acid.

In the polymerizable composition, suitably at least 20% by weight, preferably at least 30% by weight and especially at least 40% by weight of the composition comprises the polymerizable component. Independently, the polymerizable component is suitably present at a level not exceeding 95%, preferably not exceeding 90% and especially not exceeding 85% by weight of the composition.

Suitably, the organoborane/amine complex is present at a level of at least 0.2%, preferably at least 1% and more preferably at least 2% by weight of the composition. Independently, the complex is suitably present at a level not exceeding 8%, preferably not exceeding 6% and especially not exceeding 4% by weight of the composition.

If present, the disassociating compound is present at a level of at least 1%, preferably at least 1.5% and more preferably at least 2% by weight of the composition. Independently, the disassociating compound is suitably present at a level not exceeding 8%, preferably not exceeding 6% and especially not exceeding 4% by weight of the composition.

The adhesive to be employed in the present invention suitably is capable of providing a bond between a 30% glass filled polypropylene structural member and the reinforcing member without the structural member having been subjected to any surface treatment when tested in accordance with the procedure set out in ASTM D1002. Preferably, the adhesive provides a bond when tested under this regime including in addition being subjected to thermal cycling and high humidity. Thermal cycling in this context suitably includes cycling over a range from −40° C. to greater than 120° C. Humidity levels can vary from dry to fully saturated.

The adhesive may be used in the manner set out in International Patent Application No. PCT/US00/33806. Optionally, further components may be included as additives in the composition. Suitable additives include those set out in International Patent Application No. PCT/US00/33806.

The assembly suitably is able to withstand exposure to heat at a temperature of 100° C. and suitably at up to 120° C. or more. Further, the assembly desirably should also be able to withstand loads applied during production and also imposed in use, for example by slamming the bonnet, application of load to the bonnet latch and vibration and fatigue during use due to displacement from the road surface. The amount and location of adhesive is suitably selected having regard to the design and structure of the automobile to which the application applies.

In fabricating the assembly, the adhesive composition is suitably applied to one or both of the members in those areas which are to be joined. The adhesive is suitably cured at ambient temperature and curing preferably is initiated prior to the members being brought together. The members are then suitably contacted while the adhesive remains able to bond the two members, for example, as the adhesive becomes tacky. If desired, the members may be held in place by mechanical means for example, snap-fits, mechanical fasteners or temporary clips. The surfaces are suitably clean and substantially free of foreign materials, for example fats, oils and water. The complementary surfaces may become adhered together relatively quickly so allowing the bonded assembly to be handled, for example on an automobile production line. The adhesive suitably continues to cure to provide maximum bond strength and this may take a period of hours.

The process conditions employed in bonding the structural member and reinforcing member together may vary according to the specific adhesive employed.

By way of illustration only, an adhesive comprising methyl methacrylate as the polymerizable component and an organoborane/amine complex as herein described may be applied to a structural member comprising polypropylene which has not been pretreated, mixed with a curing component and left for a period of 1 to 10 minutes, prior to bringing a steel reinforcing member brought into contact with the structural member. The adhesive suitably bonds the two members sufficiently within 10 to 30 minutes after curing is initiated to allow the assembly to be handled. Subsequently, the adhesive continues to cure to provide a bond of maximum strength after 10 to 30 hours. The process is suitably carried out at ambient temperature.

As desired, mechanical fixing may be employed in addition to adhesive bonding to hold the structural member and the reinforcing member together.

In FIG. 1, a structural member (1) and a reinforcing member (2) are shown prior to bonding together in accordance with the method of the invention. FIG. 2 shows the members (1) and (2) bonded together after assembly.

The structural member (1) is made of a molded plastics material having a low energy surface and suitably is made of polypropylene or polyamide and typically is produced by compression moulding or injection moulding. The reinforcing member (2) is typically made of steel or aluminium.

The structural member (1) and the reinforcing member (2) are shaped as desired according to the design of the automobile and are provided with complementary surfaces (3) and (4) such that the members (1) and (2) fit snugly together and the invention enables the members (1) and (2) to be assembled after being produced.

Adhesive is applied to part or all of the complementary surface (3) and/or (4) and the reinforcing member (2) and the structural member (1) are brought into contact by relative movement towards each other in the direction A so that the complementary surfaces (3) and (4) abut one another. The adhesive is then cured or allowed to cure to provide a bonded assembly according to the invention, a part of which is as shown in FIG. 2.

FIG. 2 indicates a plane B—B through which a cross-section illustration is shown in FIG. 3. In FIG. 3, the reinforcing member (2) has a shallow channel (5) the inside of which defines the complementary surface (4) into which the complementary surface (3) of the structural member (1) is located in manufacturing the assembly. Adhesive is placed on at least part of the complementary surface (3) and/or (4) prior to assembly and forms the bond by which the members (1) and (2) are adhered.

The structural member (1) is also provided with side channels (6) and (7) and the reinforcing member (2) is provided with lips (8) and (9) which engage with the side channels (6) and (7) in a complementary manner. The surfaces of the channels (6) and (7) and lips (8) and (9) may be bonded by the provision of adhesive between the respective surfaces. Alternatively, these surfaces may not be bonded but in any event provide physical abutment between the respective parts of the structural member (1) and the reinforcing member (2) to enhance resistance to impact in the direction C, that is from the front of the automobile and to provide improved alignment between the members (1) and (2) during assembly.

FIG. 4 shows a cross section of an assembly according to the invention of a different design to that shown in FIG. 3. The structural member (1) and the reinforcing member (2) are aligned and adhered along complementary surfaces (3) and (4). Physical abutment of the members (1) and (2) along lips (10) and (11) and (12) and (13) respectively provide enhanced resistance to impact.

FIGS. 5 to 8 show a structural member (14) of different design in each case bonded to a reinforcing member (15) by means of adhesive (16) capable of bonding to a low surface energy plastics material. The structural member (14) is made of a plastics materials having a low energy surface and suitably is made of polypropylene or polyamide. In FIG. 5, the structural member (14) is a generally "C" shaped EAU and in FIG. 7 the structural member (14) is a blow moulding and in FIG. 8 it is an injection moulding.

Figure 6:
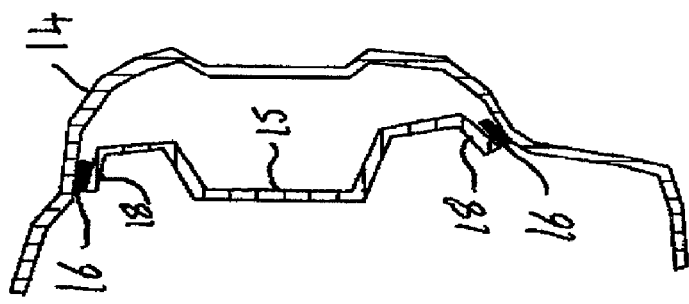

The reinforcing member (15) is typically made of steel or steel and aluminium or may be made of plastics material. In FIG. 6 the reinforcing member (15) is a so-called "close-out" member which means that the member (15) is disposed across the open ends of the "C" shaped member (14) so as to form a box cross section.

Figure 7:
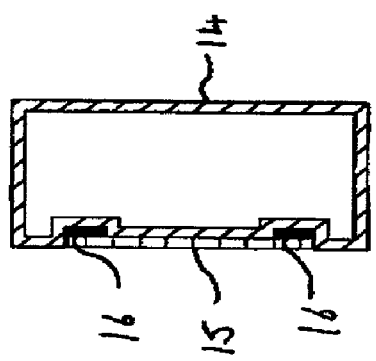
Figure 8:
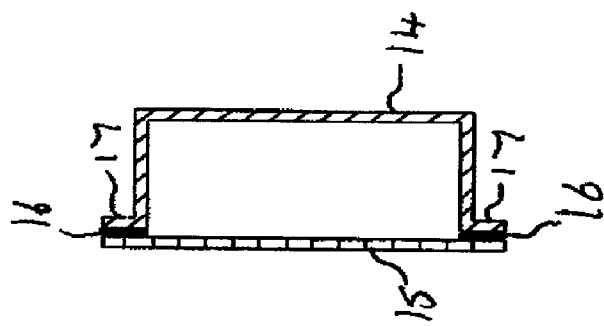

The structural member (14) may have lips (17) as shown in FIGS. 5 and 8 and the adhesive (16) may be applied to the lips (17) on or to the reinforcing member (15) at the required location. The adhesive (16) is preferably applied to either or both the structural member (14) and reinforcing member (15) at all points at which they are in contact. Alternatively, the reinforcing member (15) may have lips (18) to which adhesive (16) is applied and which are then contacted with the structural member (14) as illustrated in FIG. 6 or, as shown in FIG. 7, neither the reinforcing member (15) nor the structural member (14) need have lips.

Figure 11:
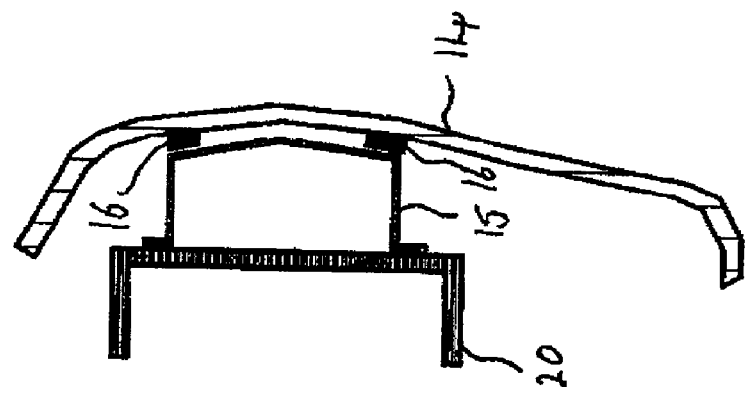
FIGS. 9 to 11 show cross-section views of bumper systems in which the bumper fascia and the bumper beam are connected through a linking component.
Figure 10:
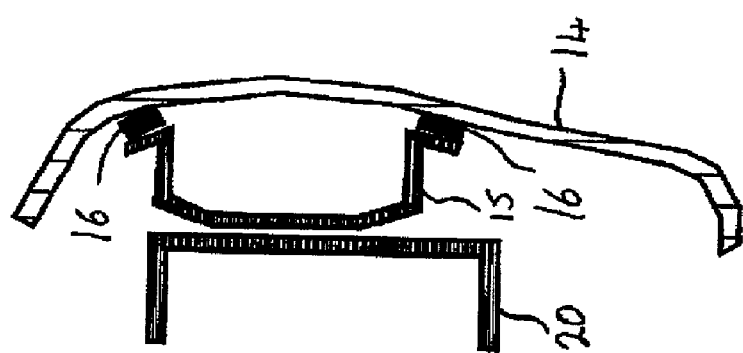
Figure 9:
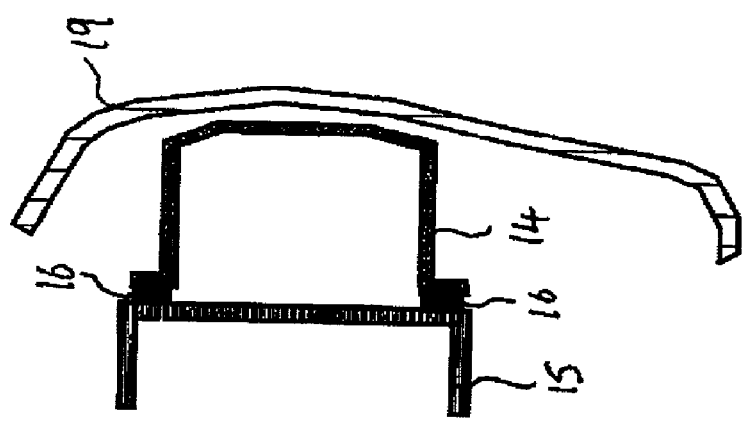
Figure 12:
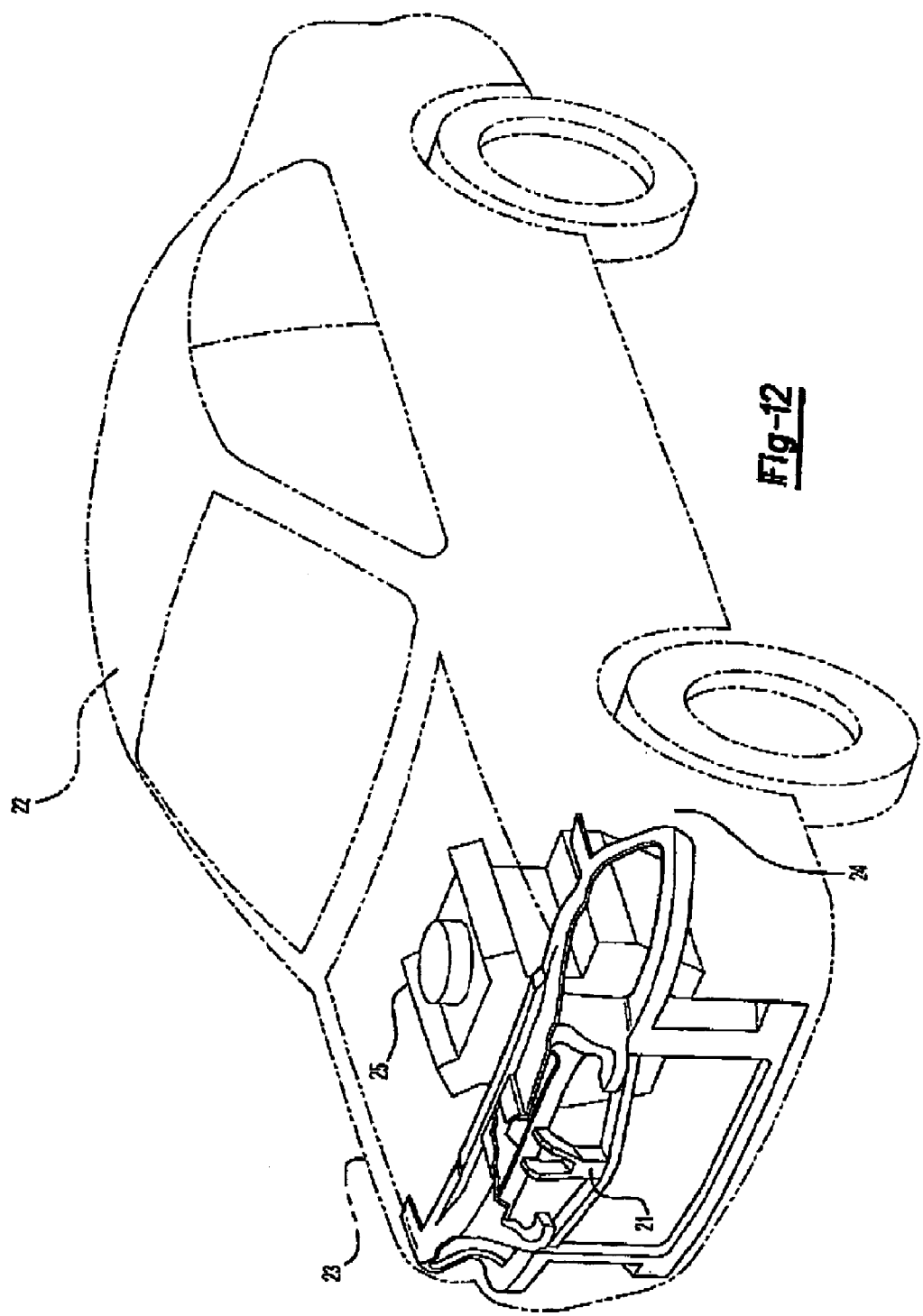
FIG. 12 illustrates a conventional front end carrier for an automobile that is part of the body of the automobile which joins two sides of the front of the automobile together.

FIGS. 9 to 11 show a structural member (14) connected to a reinforcing member (15) by means of an adhesive (16) which preferably is employed along the length of the members (14) and (15). In FIG. 9, the structural member (14) is an EAU and is made of a polypropylene moulding. The bumper fascia (19) is spaced apart from member (14) and connected through conventional means to another part of the vehicle (not shown).

In FIGS. 10 and 11, the bumper fascia is the structural member (14). The "C" shaped EAU is the reinforcing member (15) and is made of steel. The member (15) is spaced apart from the bumper beam (20). The member (15) is bonded to the bumper fascia (14).

Suitably, the generally "C" shaped component as illustrated in FIG. 9 (structural member (14)) and FIGS. 10 and 11 (reinforcing member (15)) provides excellent impact resistance properties. Once assembled, the open end of the "C" section is closed by being bonded to the reinforcine member (15) in FIG. 9, the bumper fascia (19) in FIG. 10 and is located next to, but not bonded to, the bumper beam (20) in FIG. 11 so creating a closed box section. The thickness of the box section and the thickness of the walls defining the box section determine the stiffness of the assembly and the performance of the assembly under impact. The horizontal walls that are the top and bottom part of the "C" shaped component may be designed to buckle under a certain load. This enables the impact resistance of the assembly to be tailored according to the intended use. The height of the box section that is the length of the back part of the "C" shaped component may be tailored to pxovide desired properties according to the intended use.

Use of an EAU having a "C" shaped cross section is especially advantageous in that the box shaped cross section formed on assembling the bumper system possesses excellent strength characteristics when subjected to impact.

The invention claimed is:

1. An automotive assembly comprising a structural member made of a molded plastic material having an unprimed low energy surface which is not surface treated and a reinforcing member attached to the structural member, the structural member and reinforcing member having complementary surfaces and being attached by means of an adhesive, on at least part of one of the complementary surfaces wherein the adhesive comprises an organoborane amine complex, one or more of monomers, oligomers or polymers having olefinic unsaturation which is capable of polymerisation by free radical polymerisation, and a compound which causes the complex to disassociate so as to release the organoborane.

2. An automobile assembly according to claim 1 for an automobile which has two sides wherein the assembly comprises a front end carrier and the carrier joins the two sides of the automobile together at the front of the automobile and in which the front end carrier is aligned transversely so as to define a compartment.

3. An automobile assembly according to claim 1 wherein the assembly comprises a bumper system in which:
   i) the reinforcing member is an energy absorbing unit made of metal or plastic material and the structural member is a bumper fascia made of plastic material; or
   ii) the reinforcing member is a bumper beam made of metal and the structural member is an energy absorbing unit made of plastic material.

4. An automobile assembly according to claim 3 in which the energy absorbing unit defined in part i) or part ii) of claim 3 has a generally "C" shaped cross section.

5. An automobile assembly according to claim 4 wherein the reinforcing member is an energy absorbing unit which is bonded to the bumper fascia such that a closed box section is formed between the energy absorption unit and the bumper fascia.

6. An automobile assembly according to claim 5 wherein the horizontal walls of the reinforcing member are designed to buckle under a certain load.

7. An automotive assembly according to claim 6 wherein the reinforcing member has lips adapted to be contacted to the structural member by means of the adhesive.

8. An automotive assembly according to claim 7 wherein the adhesive is applied along the length of the complementary surfaces of reinforcing member and structural member.

9. An automobile assembly according to claim 4 wherein the structural member is an energy absorbing unit which is bonded to the bumper beam such that a closed box section is formed between the energy absorption unit and the bumper beam.

10. An automobile assembly according to claim 9 wherein the horizontal walls of the structural member are designed to buckle under a certain load.

11. An automobile assembly according to claim 10 wherein the structural member has lips adapted to be contacted to the reinforcing member by means of the adhesive.

12. An automobile assembly according to claim 11 wherein the adhesive is applied along the length of the complementary surfaces of reinforcing member and structural member.

13. An automotive assembly according to claim 1 in which the plastic material of the structural member is selected from short glass fibre filled polypropylene, long glass fibre filled polypropylene, glass filled polyamide and glass filled polyamide alloys.

14. An automotive assembly according to claim 1 in which the reinforcement member is made of steel, aluminium or both.

15. An automotive assembly according to claim 1 in which the structural member and reinforcing member are attached by means of an adhesive along the complementary surfaces of the two members.

16. An automotive assembly according to claim 1 in which the reinforcing member comprises contours or channels which are complementary with the surface of the structural member so as to provide resistance to stress by means of adhesion or abutment between the structural and reinforcing member.

17. An automotive assembly of claim 1 wherein the amine part of the organoborane amine complex is selected from the group of amines having an amidine structural component; aliphatic heterocycles having at least one nitrogen in the heterocyclic ring; primary amines which in addition have one or more hydrogen bond accepting groups wherein there are at least two carbon atoms between the primary amine and the hydrogen bond accepting group; and conjugated imines.

18. An automotive assembly of claim 1 wherein the structural member is attached to the reinforcing member by means of a continuum of an adhesive.

19. An automotive assembly comprising a structural member made of a molded glass filled polypropylene or glass filled polyamide having a surface energy of less than 45 mJ/m$^2$ which is unprimed, and a reinforcing member made from a metal selected from steel, zinc and aluminium attached to the structural member, the structural member and reinforcing member having complementary surfaces and being attached by means of an adhesive which is capable of bonding to a substrate having a surface energy of less than 45 mJ/m$^2$ disposed between at least part of the complementary surfaces so as to bond the complementary surfaces together, the adhesive being derived from a polymerisable composition comprising
  i) an organoborane amine complex;
  ii) one or more of monomers, oligomers or polymers having olefinic unsaturation which is capable of polymerisation by free radical polymerisation; and, optionally
  iii) a compound which causes the complex to disassociate so as to release the organoborane portion of the organoborane amine complex.

20. An automotive assembly according to claim 19 in which the reinforcing member comprises contours or channels which are complementary with the surface of the structural member so as to provide resistance to stress by means of adhesion or abutment between the structural and reinforcing member.

21. An automotive assembly according to claim 19 in which the organoborane part of the organoborane amine complex is selected from a trialkylborane and an alkyl cycloalkylborane.

22. An automotive assembly of claim 19 wherein the amine part of the organoborane amine complex is selected from the group of amines having an amidine structural component; aliphatic heterocycles having at least one nitrogen in the heterocyclic ring; primary amines which in addition have one or more hydrogen bond accepting groups wherein there are at least two carbon atoms between the primary amine and the hydrogen bond accepting group and conjugated imines.

23. An automotive assembly according to claim 22 in which the amine is selected from dimethylaminopropyl amine, methoxypropyl amine, dimethylaminoethylamine, dimethylaminobutylamine, methoxybutyl amine, methoxyethyl amine, ethoxypropylamine, propoxypropylamine, amine terminated polyalkylene ethers, aminopropylmorpholine, isophoronediamine, and aminopropylpropanediamine.

24. An automotive assembly of claim 19 wherein the structural member is attached to the reinforcing member by means of a continuum of an adhesive.

25. An automobile assembly according to claim 19 for an automobile which has two sides wherein the assembly comprises a front end carrier and the carrier joins the two sides of the automobile together at the front of the automobile and in which the assembly is aligned transversely so as to define a compartment.

26. An automobile assembly according to claim 19 wherein the assembly comprises a bumper system in which:
  i) the reinforcing member is an energy absorbing unit made of metal or plastic material and the structural member is a bumper fascia made of plastic material; or
  ii) the reinforcing member is a bumper beam made of metal and the structural member is an energy absorbing unit made of plastic material.

27. A front end carrier comprising a structural member wherein the structural member is made of a molded plastic material having an untreated and unprimed low energy surface and a reinforcing member wherein the structural member and reinforcing member have complementary surfaces and are attached by means of an adhesive which is capable of bonding to an untreated and unprimed low energy surface substrate, wherein the adhesive is located on at least part of one or both of the complementary surfaces; wherein the front end carrier is adapted to join the two sides of the front of an automobile together and enclose the engine compartment.

28. A front end carrier according to claim 27 in which the reinforcing member is made of steel, aluminium or both.

29. A front end carrier according to claim 27 in which the plastic material of the structural member is selected from short glass fibre filled polypropylene, long glass fibre filled polypropylene, glass filled polyamide and glass filled polyamide alloys.

30. A front end carrier according to claim 27 in which the reinforcing member comprises contours or channels which are complementary with the surface of the structural member so as to provide resistance to stress by means of adhesion or abutment between the structural and reinforcing member.

31. A front end carrier according to claim 27 wherein the structural member is made of a molded glass filled polypropylene or glass filled polyamide having a surface energy of less than 45 mJ/m$^2$ which is untreated and unprimed, and the reinforcing member is made from a metal selected from steel, zinc or aluminium attached to the structural member, the structural member and the reinforcing member being attached by means of the adhesive, which is capable of bonding to a substrate having a surface energy of less than 45 mJ/m$^2$, disposed between at least part of the complementary surfaces so as to bond the complementary surfaces together.

32. A front end carrier according to claim 27 wherein the adhesive is derived from a polymerisable composition comprising:
  i) an organoborane amine complex;
  ii) one or more of monomers, oligomers or polymers having olefinic unsaturation which is capable of polymerization by free radical polymerization; and optionally
  iii) a compound which causes the complex to disassociate so as to release the organoborane portion of the organoborane amine complex.

33. A front end carrier according to claim 32 wherein the amine part of the organoborane amine complex is selected from dimethylaminopropyl amine, methoxypropyl amine, dimethylaminoethylamine, dimethylaminobutylamine, methoxybutyl amine, methoxyethyl amine, ethoxypropylamine, propoxypropylamine, amine terminated polyalkylene ethers, aminopropylmorpholine, isopohoronediamine and aminopropylpropanediamine.

34. A front end carrier according to claim 33 in which the organoborane part of the organoborane amine complex is selected from a trialkylborane and an alkyl cycloalkylborane.

35. A front end carrier of claim 32 wherein the amine part of the organoborane amine complex is selected from the group of am ines having an amidine structural component; aliphatic heterocycles having at least one nitrogen in the heterocyclic ring; primary amines which in addition have one or more hydrogen bond accepting groups wherein there are at least two carbon atoms between the primary amine and the hydrogen bond accepting group; and conjugated imines.

36. A front end carrier of claim 32 wherein the structural member is attached to the reinforcing member by means of a continuum of the adhesive.

37. A front end carrier according to claim 32 which further comprises one or more housings for lighting assemblies.

38. An automobile assembly for an automobile which has two sides wherein the assembly comprises a front end carrier according to claim 27 and the carrier joins the two sides of the automobile together at the front of the automobile and in which the carrier is aligned transversely to the two sides so as to define a compartment.

39. An automotive assembly according to claim 38 in which the plastic material of the structural member is selected from short glass fibre filled polypropylene, long glass fibre filled polypropylene, glass filled polyamide and glass filled polyamide alloys.

40. An automotive assembly according to claim 38 in which the reinforcing member is made of steel, aluminium or both.

41. An automotive assembly according to claim 38 in which the reinforcing member comprises contours or channels which are complementary with the surface of the structural member so as to provide resistance to stress by means of adhesion or abutment between the structural and reinforcing member.

42. An automotive assembly according to claim 38 wherein the structural member is made of a molded glass filled polypropylene or glass filled polyamide having a surface energy of less than 45 mJ/m$^2$ which is untreated and unprimed, and the reinforcing member is made from a metal selected from steel, zinc or aluminium wherein the structural member and the reinforcing member are attached by means ofihe adhesive, which is capable of bonding to a substrate having a surface energy of less than 45 mJ/m$^2$, disposed between at least part of the complementary surfaces so as to bond the complementary surfaces together.

43. An automotive assembly according to claim 38 wherein the adhesive is derived from a polymerisable composition comprising:
  i) an organoborane amine complex;
  ii). one or more of monomers, oligomers or polymers having olefinic unsaturation which is capable of polymerization by free radical polymerization; and optionally, and
  iii) a compound which causes the complex to disassociate so as to release the organoborane portion of the organoborane amine complex.

44. An automotive assembly according to claim 43 wherein the amine part of the organoborane amine complex is selected from dimethylaminopropyl amine, methoxypropyl amine, dimehtylaminoethylamine, dimethylaminobutylamine, methoxybutyl amine, methoxyethyl amine, ethoxypropylamine, propoxypropylamine, amine terminated polyalkylene ethers, aminopropylmorpholine, isophoronediamine and aminopropylpropanediamine.

45. An automotive assembly according to claim 43 in which the organoborane part of the organoborane amine complex is selected from a trialkylborane and an alkyl cycloalkylborane.

46. An automotive assembly ofclaim 43 wherein the amine part of the organoborane amine complex is selected from the group of amines having an amidine structural component; aliphatic heterocycles having at least one nitrogen in the heterocyclic ring; primary amines, which in addition have one or more hydrogen bond accepting groups wherein there are at least two carbon atoms between the primary amine and the hydrogen bond accepting group; and conjugated imines.

47. An automotive assembly of claim 38 wherein the structural member is attached to the reinforcing member by means of a continuum of the adhesive.

48. An automotive assembly according to claim 38 which further comprises one or more housings for lighting assemblies.

* * * * *

UNITED STATES PATENT AND TRADEMARK OFFICE
CERTIFICATE OF CORRECTION

PATENT NO.         : 7,185,946 B2                                      Page 1 of 1
APPLICATION NO.    : 10/171936
DATED              : March 6, 2007
INVENTOR(S)        : Peter J. Cate, Pádraig Naughton and Hein J. Koelman It is certified that error appears in the above-identified patent and that said Letters Patent is hereby corrected as shown below:

In column 15, Claim 35, line 7, "am ines" should read -- amines --.

In column 16, line 1, "ofihe" should read -- of the --.

In column 16, Claim 44, line 19, "dimehtylaminoethylamine" should read -- dimethylaminoethylamine --.

In column 16, Claim 46, line 28, "ofclaim" should read -- of claim --.

Signed and Sealed this

Twenty-fifth Day of December, 2007

JON W. DUDAS
*Director of the United States Patent and Trademark Office*